United States Patent [19]

Dietrich

[11] 3,967,236

[45] June 29, 1976

[54] COMMAND CUE FOR A FLIGHT DIRECTOR INSTRUMENT

[75] Inventor: John Peter Dietrich, Glendale, Ariz.

[73] Assignee: Sperry Rand Corporation, New York, N.Y.

[22] Filed: Mar. 29, 1974

[21] Appl. No.: 456,322

[52] U.S. Cl............................ 340/27 AT; 73/178 H; 116/DIG. 43
[51] Int. Cl.² .......................................... G08G 5/00
[58] Field of Search................ 343/107; 340/27 NA, 340/27 AT, 27 R, 225; 116/117 D, 124 C, DIG. 43; D10/67; 73/178 H

[56] References Cited
UNITED STATES PATENTS

| | | | |
|---|---|---|---|
| 2,262,245 | 11/1941 | Moseley et al...................... | 340/212 |
| 2,291,610 | 8/1942 | Crane .................................. | 340/225 |
| 2,567,212 | 9/1951 | Klopp et al...................... | 340/27 AT |
| 2,613,350 | 10/1952 | Kellogg.............................. | 343/108 |
| 2,613,352 | 10/1952 | Kellogg.............................. | 343/108 |
| 2,845,623 | 7/1958 | Iddings.............................. | 343/107 |
| 3,048,836 | 8/1962 | Guarino et al...................... | 340/27 |
| 3,521,227 | 7/1970 | Congleton et al................. | 340/27 R |
| D112,743 | 12/1938 | Haven.................................. | D10/67 |

*Primary Examiner*—Maynard R. Wilbur
*Assistant Examiner*—T. M. Blum
*Attorney, Agent, or Firm*—Howard P. Terry; Albert B. Cooper

[57] ABSTRACT

An indicator for a flight director instrument particularly for use in rotary wing aircraft includes a command cue having a shape resembling that of an associated aircraft control element or stick and includes cooperating indicia representative of the direction to move the control stick so as to center the cue and thereby satisfy the command. This novel indicator arrangement engenders an instinctive pilot response to move the associated control stick to satisfy the flight director command.

4 Claims, 2 Drawing Figures

COMMAND CUE FOR A FLIGHT DIRECTOR INSTRUMENT

BACKGROUND OF THE INVENTION

1. Field of the Invention

The invention relates to flight director instruments particularly for rotary wing aircraft.

2. Description of the Prior Art

Flight director instruments and systems are well known for use in aircraft for providing visual commands to the pilot, who, by manipulation of the controls, flies the craft so as to satisfy the commands thereby effecting desired flight conditions; see for example Applicant's assignee's U.S. Pat. Nos. 2,613,350, 2,613,352 or 2,782,395. As shown therein, the conventional crosspointer flight director indicator instrument utilizes vertical and horizontal command pointers or bars and a stationary airplane symbol at the center of the instrument. Flight director commands are satisfied by the pilot "flying the airplane symbol toward the bars." Such aircraft control requires at least rudimentary thought on the part of the pilot so as to manipulate the control column, control wheel and rudder pedals of, for example, conventional fixed wing aircraft so as to satisfy the flight director commands. Additionally, visual cues such as "doughnuts," movable wedges and short bars are utilized in flight director instruments to provide visual references to the pilot for a variety of flight regimes such as, for example, glide slope and localizer displacement references in an instrument landing system or speed deviations from a desired speed, etc. Such flight director instruments have also been utilized in helicopters in a similar manner; see for example Applicant's assignee's U.S. Pat. No. 2,845,623.

Although as is known the flight director concept represents a significant improvement over the pilot assimilating raw data from basic aircraft instruments and making his own command decisions, present day flight director indicators and cues do not trigger instinctive recognition and responses in pilots with regard to the actual controls and the motions thereof required to satisfy the flight director commands.

SUMMARY OF THE INVENTION

The present invention provides a flight director indicator comprising a cue symbolically shaped to resemble the associated aircraft control element and in use exhibits a motion similar to that of the control element. The indicator further includes indicia associated with the cue for defining the direction to move the associated control element so as to satisfy the flight director command.

In its preferred embodiment the invention is applied to a helicopter flight director indicator and cue for providing visual commands with regard to the collective pitch control stick of the craft.

DESCRIPTION OF THE PREFERRED EMBODIMENT

Figure 1:
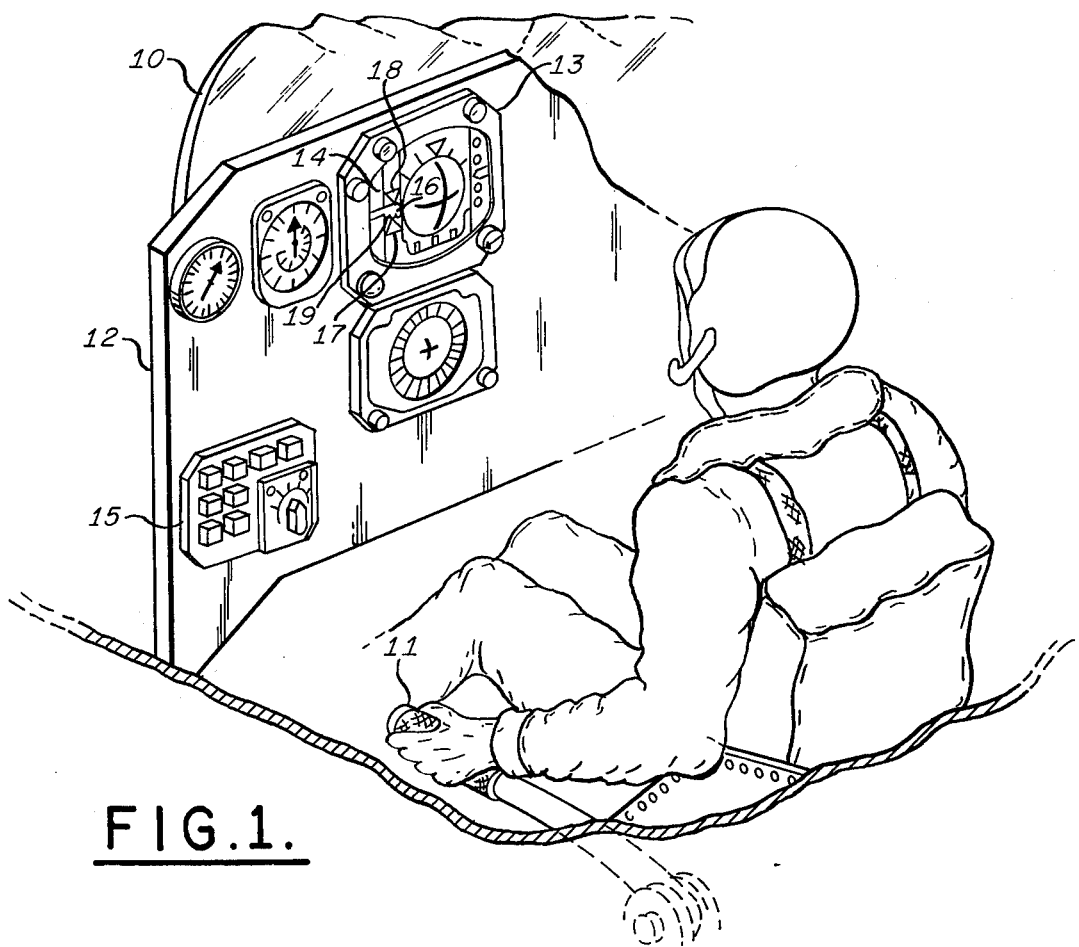
FIG. 1 is a perspective view of a helicopter cockpit showing a flight director instrument having the novel indicator of the present invention as well as the associated collective pitch control stick of the craft.
Figure 2:
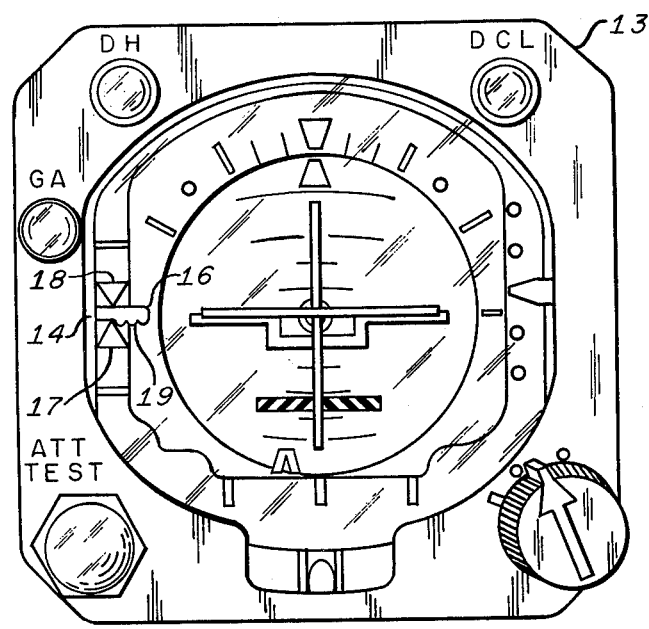
FIG. 2 is an enlarged front elevation view of the flight director instrument having the novel indicator and cue of the present invention.

Referring to FIG. 1 as well as to FIG. 2 in which like reference numerals indicate like components with respect to FIG. 1, a helicopter cockpit 10 including the collective pitch control stick 11 has an instrument panel 12 with a flight director instrument 13. The flight director instrument 13 includes an indicator 14 to provide visual commands to the pilot who manually operates the collective pitch stick 11 so as to satisfy the commands. The instrument panel 12 includes a mode selector 15 for engaging selected flight modes in which the indicator 14 would be utilized such as in the collective or power axis modes of vertical speed, altitude hold and glide slope control. As can be most readily appreciated from FIG. 2, the indicator 14 includes a cue 16 and indicia 17 and 18. The cue 16 has a shape and orientation resembling that of the collective pitch control stick 11 and, with the instrument 13 mounted for use in the instrument panel 12, the cue 16 exhibits a vertical motion with respect to the aircraft similar to that of the control stick 11. The control stick 11 and the cue 16 are both generally horizontally disposed with respect to the helicopter. Thus the cue 16 moves upwardly and downwardly to provide visual commands to the pilot who correspondingly operates the collective pitch control stick 11 in an upward or downward direction so as to satisfy the visual command. The cue 16 has protuberances 19 at the extremity thereof generally corresponding to the extremity of the control stick 11 grasped by the pilot and are shaped to resemble the fingers of the pilot's hand grasping the control stick.

The indicia 17 and 18 comprise respective triangles vertically disposed with respect to each other with respective apexes facing each other defining a central or zero command position for the cue 16. The upwardly facing apex of the triangle 17 and the downwardly facing apex of the triangle 18 are representative of the direction that the pilot is commanded to move the collective pitch control stick 11 so as to center the cue 16 between the triangles 17 and 18.

In operation, when an appropriate flight mode is engaged by the mode selector 15, visual commands are provided to the pilot by the cue 16 to provide craft control via the collective pitch control stick 11. When the command signals to the flight instrument 13 provided by the flight director system causes the cue 16 to move upwardly and hence become associated with the triangle 18, the pilot is commanded to move the control stick 11 downwardly by the downwardly pointing triangle 18. Conversely, when the cue 16 moves downwardly, the upwardly pointing triangle 17 indicates to the pilot that the control stick 11 is to be moved correspondingly upwardly.

It is thus appreciated that because of the shape of the cue 16 with respect to the control stick 11 and the similar motions thereof as well as because of the pointing symbols 17 and 18, the collective pitch control stick 11 is instinctively moved by the pilot in a direction to return the symbolic collective cue 16 to the central position between the triangles 17 and 18. It is believed that this instinctive recognition and response by pilots is not engendered to the same degree utilizing prior art flight director cues such as doughnut, wedges and short plain bar elements. Thus it is appreciated that because of the present invention, fewer control reversals are experienced.

Although the preferred embodiment of the invention has been disclosed in terms of flight director vertical path control of a helicopter, it will be appreciated that the present invention may be utilized to the same beneficial effect in any flight director environment.

The above described embodiment of the invention has been explained in terms of provided visual flight director commands to the pilot. Such commands are generated via signals applied to the flight director instrument 13 to move the cue 16 as described above. For example, the interaction between the cue 16 and the control stick 11 via the human pilot of the craft may be effected by a flight director system such as that disclosed in copending U.S. patent application Ser. No. 456,321, entitled "Helicopter Flight Path Control," filed in the name of Harry Miller on Mar. 29, 1974 and assigned to the assignee of the present invention. Although the present invention was described in the environment of a helicopter having a collective pitch control stick that is operated by upward and downward motions, the flight director instrument illustrated in FIG. 2 may also be utilized in helicopters with other collective pitch control configurations. In such instances the ornamental design for the indicator 14 may be appreciated as covered in copending design patent application Ser. No. 455,483 entitled "Indicator for Flight Instrument," filed in the name of the present inventor on Mar. 27, 1974, and assigned to the assignee of the present invention.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An indicator in a flight director instrument for use in rotary wing aircraft having a collective pitch control stick which is normally disposed for generally vertical control motions with respect to said aircraft for controlling collective pitch by generally vertical manual movement of said stick, said indicator comprising
  an elongated bar shaped cue generally resembling the shape of said collective pitch control stick,
  said cue being mounted in said flight director instrument which when in use in said aircraft is part of a flight director system having means for moving said cue in accordance with a collective pitch command,
  said cue being mounted in said flight director instrument normally horizontally disposed with respect to said aircraft for generally vertical motion with respect thereto, and
  two pointing symbols disposed one above the other and associated with said cue to define a central position therefor, the upper of said two symbols pointing downwardly and the lower of said two symbols pointing upwardly, the region between said two symbols defining said central position for said cue, said symbols pointing in the respective directions to move said collective pitch control stick so as to center said cue at said central position when said cue in deviating from said central position becomes associated with one of said symbols, thereby satisfying said collective pitch command, said cue exhibiting vertical deviations above and below said central position in accordance with said collective pitch command,
  said control stick shaped cue, said vertical deviations thereof and said pointing symbols tending to engender an instinctive reaction associating said cue with said control stick and said deviations and pointing symbols with the direction to move said control stick to satisfy said collective pitch command, thereby engendering an instinctive reaction to position said control stick in the proper direction to satisfy said collective pitch command.

2. The indicator of claim 1 in which said central position comprises a zero command position for said cue.

3. The indicator of claim 2 in which said two symbols comprise two triangles respectively vertically disposed with respect to each other with respective apexes facing each other defining said zero command position.

4. The indicator of claim 1 in which said cue further comprises a plurality of protuberances at the extremity of said bar resembling the fingers of the pilot of said aircraft grasping said collective pitch control stick, said protuberances being positioned at the extremity of said bar corresponding to the extremity of said control stick normally grasped by said pilot.

* * * * *